United States Patent [19]
Ready et al.

[11] 3,787,278

[45] Jan. 22, 1974

[54] MOLDED MULTIPLE DENSITY POLYURETHANE FOAM

[75] Inventors: William C. Ready, East Haven; John E. Puig, Wallingford; Bruce G. Van Leuwen, Hamden, all of Conn.

[73] Assignee: Olin Corporation, New Haven, Conn.

[22] Filed: Jan. 24, 1972

[21] Appl. No.: 220,517

Related U.S. Application Data

[62] Division of Ser. No. 41,372, May 28, 1970, Pat. No. 3,658,972.

[52] U.S. Cl.................................. 161/159, 161/166
[51] Int. Cl............................................ B32b 3/26
[58] Field of Search.. 161/36, 37, 38, 159, 166, 161

[56] References Cited
UNITED STATES PATENTS

| | | |
|---|---|---|
| 2,133,805 | 10/1938 | Brown.............................. 161/159 |
| 2,660,194 | 11/1953 | Hoffman........................... 161/159 |
| 3,104,192 | 9/1963 | Hackländer....................... 161/159 |
| 3,402,520 | 9/1968 | Lee et al........................... 161/161 |
| 3,411,967 | 11/1968 | Rowland et al.................... 161/161 |

Primary Examiner—William J. Van Balen
Attorney, Agent, or Firm—F. A. Iskander, D. F. Clements & T. P. O'Day

[57] ABSTRACT

Molded, multiple density polyurethane foams and a process for their preparation are disclosed. The free rise of a polyurethane foam forming reaction mixture, placed in a mold, is constrained or limited in one or more sections of the mold. Then, after completion of the foam rise but before substantial curing, the foam, or a section thereof, is compressed to a fraction of its free rise volume and thereafter curing of the foam is completed.

Molded, multiple density foams are of particular utility in making bucket seats for use by the automotive industry.

4 Claims, 5 Drawing Figures

PATENTED JAN 22 1974 3,787,278
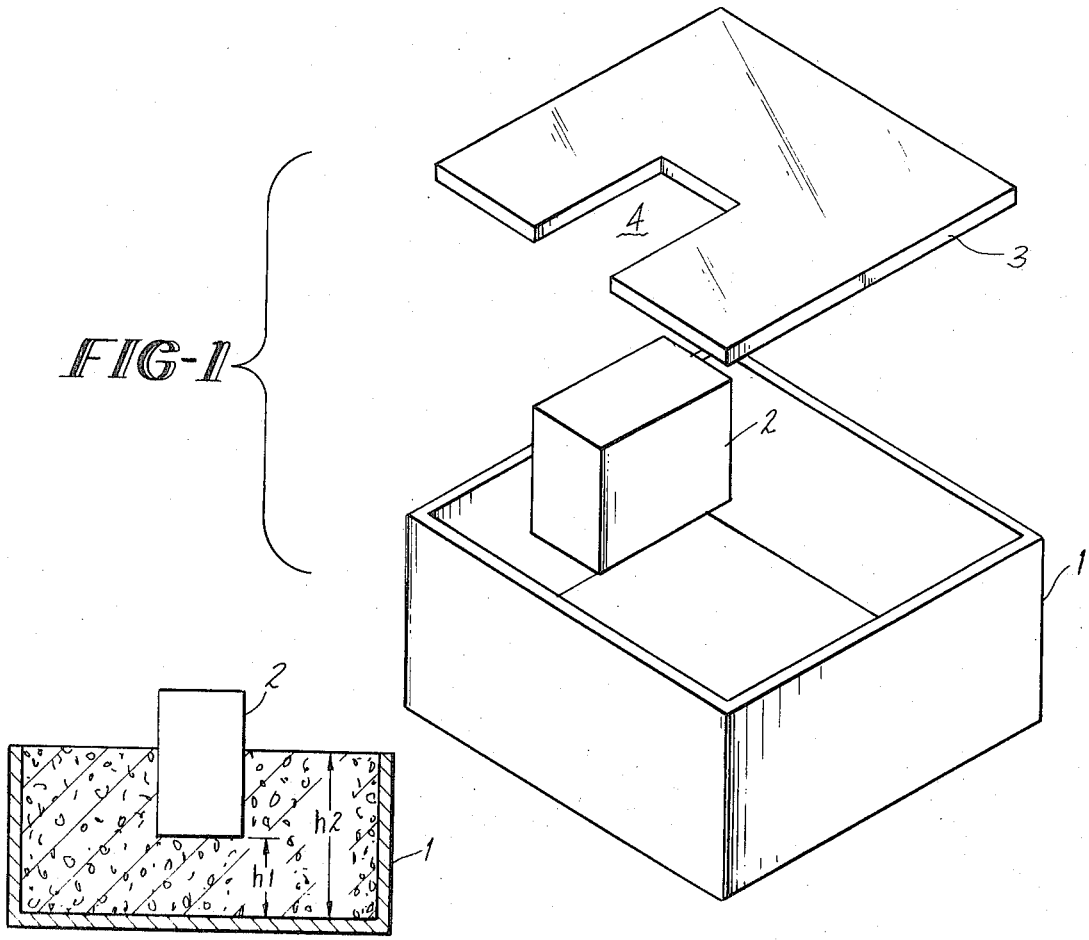
FIG-1
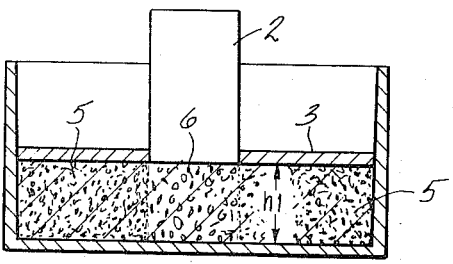
FIG-2
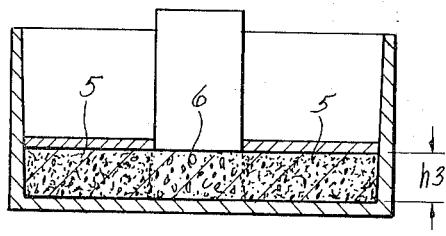
FIG-4
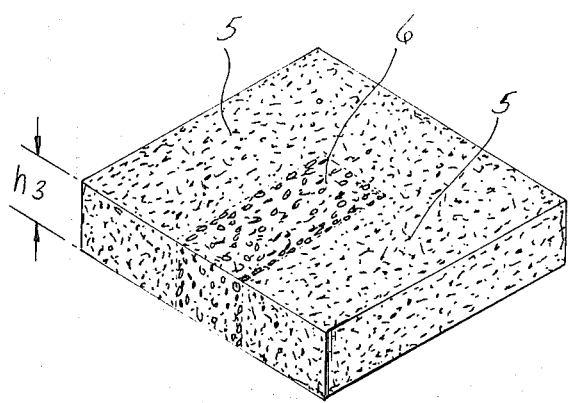
FIG-3
FIG-5

MOLDED MULTIPLE DENSITY POLYURETHANE FOAM

This application is a division of co-pending application Ser. No. 41,372, filed May 28, 1970, now U.S. Pat. No. 3,658,972.

This invention relates to molded, multiple density polyurethane foams of the flexible type, and to a process for preparing such foams.

An increasing variety of applications for flexible polyurethane foam has come about in recent years with the advent of permanently compressed, densified foam. Such foam can be prepared by a process fully described in U.S. Pat. No. 3,506,600. Employing a combination of critical, inter-related steps, the process of the patent, in summary, comprises allowing a flexible polyurethane foam forming reaction mixture to rise, thereby forming a partially cured cellular material, maintaining this material for a critical period of time at a critical environmental temperature; applying a compressive force to the partially cured cellular material to reduce its volume by a specified amount; and then completing the cure of the foam. Due to its improved firmness and durability, the resulting foam has utility in numerous applications including matresses, cushions, automotive interiors, furniture construction and the like.

In certain applications, dual or multiple density polyurethane foams, having at least one section of firm, densified foam integral with at least one other section of less dense or undensified foam can be used to great advantage. In the automotive industry, for example, there is great interest in dual density, molded polyurethane foam bucket seats comprised of firm, densified boundary regions and softer, less dense seat and back support regions.

Molded, multiple density foams are, according to the conventional techniques of the prior art, prepared by using a different foam forming reaction mixture for each sectional density desired. Along with the disadvantage of having to select and prepare more than one mixture or formulation, these techniques involve costly and burdensome processing and apparatus requirements such as carefully controlled multi-pouring steps and apparatus, carefully controlled curing conditions for each foam formulation, and so forth. Additional problems are encountered where two or more formulations have to be used, which formulations require widely differing curing conditions, with one set of curing conditions required for one foam formulation being detrimental to the foam properties in the other formulation.

It is a primary object of this invention to provide a process for making molded, multiple density polyurethane foams, which process overcomes the drawbacks of the prior art. Another object is to prepare, from a single flexible foam forming reaction mixture or formulation, flexible, molded foam having at least two integral sections of different densities. A further object is to prepare flexible, molded polyurethane foams having at least two integral sections of different densities, of which at least one section is permanently compressed foam, the boundary lines between the sections being substantially parallel to the direction of compression. These and other objects of the invention will become apparent from the following detailed description.

The above objects can be accomplished, according to the invention, by placing a flexible polyurethane foam forming reaction mixture in a mold comprising a first section having means for limiting the free rise of the foam therein and a second section which is free of means for limiting the free rise of the foam therein, then, after completion of the rise but before substantial curing of the foam, applying a compressive force to the foam whereby at least one foam section is reduced to a fraction of its original free rise height. Curing of the foam is thereafter completed. The surprising result of this procedure is an integral, molded foam having at least two well-defined sections of substantially uniform but different densities, at least one of the sections being permanently compressed foam, with the boundary lines between the sections being substantially parallel to the direction of compression.

Reference will now be made to the drawings which provide an illustration of a simplified apparatus that can be used to practice the invention.

FIG. 1 is an exploded, perspective view of a molding apparatus which may be used in practicing the invention.

FIG. 2 is a cross-sectional view of the molding apparatus containing the foam just before it is compressed.

FIG. 3 is a cross-sectional view of the molding apparatus containing the foam after one section of the foam has been compressed.

FIG. 4 is a cross-sectional view of the molding apparatus containing the foam after it has been subjected to further compression.

FIG. 5 is a perspective view of the foam after it has been compressed and cured.

FIG. 1 shows a molding apparatus comprising a mold 1, having an open top, an insert 2, and a lid 3 having a cavity 4 for telescopicly fitting into the open top and around insert 2. Although the mold illustrated in FIG. 1 is a square mold, any other mold of whatever size and configuration may be employed in practicing the invention; and such mold can be made of any material, such as wood, cardboard, metal or plastic, that is rigid enough to support the weight of the foam and the pressure to be applied thereto, and which material does not interfere with the foaming reaction.

Insert 2 and lid 3 may be of the same material as that of the mold; and the insert, and cavity 4 in the lid, need not have a square configuration as shown in the drawing but may vary in shape depending on the utility and density requirements in the finished molded foam object.

In employing this molding apparatus to practice the invention, a polyurethane foam forming reaction mixture is placed in mold 1. Insert 2, suspendedly supported above mold 1 by any convenient means such as cables (not shown), is lowered into the mold to a desired height $h_1$ (See FIG. 2) so as to occupy a predetermined section of the mold. It is then held firmly in that position such as by fastening to the exterior walls of the mold. The rising foam, when it reaches height $h_1$ is prevented from filling the space occupied by insert 2, but rises to fill the spaces surrounding it. The particular foam forming reaction mixture and the amount of it placed in the mold would be pre-calculated to just fill, on a free rise basis, the mold exclusive of the section occupied by insert 2. This is illustrated in FIG. 2 which shows a vertical cross section of the mold, the insert, and the foam at the end of the free rise or foaming period. As shown, the foam has a uniform density throughout and consists of two sections having two different heights, $h_1$ and $h_2$, respectively.

Before substantial curing of the foam, lid 3 is lowered onto the foam surface, fitting around insert 2. A compressive force, derived from any convenient means such as a hydraulic piston (not shown), is applied to the foam through lid 3, compressing the foam thereunder to height $h_1$. As shown in the cross sectional view of FIG. 3, the foam at this point will be of substantially uniform height $h_1$ and will consist of two sections, an outer section 5 of compressed foam and an inner section 6 of undensified foam. The entire foam mass is then further compressed to a uniform height $h_3$ (see FIG. 4), which is less than $h_1$, by means of a compressive force which is applied to the foam through lid 3 and insert 2. As shown in FIG. 4 the foam will thus be of uniform height throughout and will consist of two sections, an outer section 5 of highly compressed foam and an inner section 6 which is compressed to a lesser degree than section 5.

After complete curing and removal from the mold, the uniform-height foam, as illustrated in FIG. 5, will have two integral sections of substantially uniform densities. Section 5, having been subjected to a high degree of compression, will be highly densified; whereas, section 6, subjected to a lesser degree of compression, will be less densified than section 5. The boundary lines between the sections will be substantially parallel to the direction of compression.

If desired, the molding apparatus of FIG. 1 may be employed to obtain a foam having a densified outer section and an undensified inner section. This is accomplished by limiting the application of the compressive force to the outer section. For example, after compressing the foam section directly underneath lid 3, the compressive force is removed and the foam is fully cured.

By following either of the procedures described above, it has been found that the density gradient, at the juncture of the densified section and the less densified or undensified section, will be abrupt. Surprisingly, there will be substantially no gradual change from one density to another. Each foam section, while integrally bonded to the other foam section, will have a substantially uniform density throughout.

The aforesaid U.S. Pat. No. 3,506,600, which issued on Apr. 14, 1970 to N.C. Zocco and S.I. Cohen, discloses a process for making densified polyurethane foam. The entire disclosure of this patent is incorporated by reference herein.

In the preparation of the polyurethane foams of the invention, either the so-called "one-shot method" or the "semi-prepolymer technique" ("quasi-prepolymer" technique) may be employed. Any combination of polyols, including polyether polyols and polyester polyols, organic polyisocyanate, foaming agent, catalyst, and other reactants capable of forming a flexible polyurethane foam can be employed in carrying out the process of this invention; and the term "polyurethane foam forming reaction mixture" in the specification and claims herein is meant to include any such combination. It is preferable, however, to employ a polyurethane foam forming reaction mixture having a free rise density between about 0.8 and about 4.0 pounds per cubic foot. Typical formulations are described in U.S. Pat. No. 3,072,582, issued Jan. 8, 1963, and Canadian Pat. No. 705,938, issued Mar. 16, 1965.

While, as indicated above, both polyether and polyester polyols can be employed in the practice of this invention, preferred embodiments utilize the polyether polyols in the preparation of the polyurethane foam forming reaction mixture. To further illustrate suitable formulations, the polyether polyols, useful for the preparation of the polyurethane material of this invention, include oxyalkylated polyhydric alcohols having a molecular weight in the range between about 700 and about 10,000 and preferably between about 1,000 and about 6,000. The hydroxyl number of the polyether polyol is generally less than about 250 and preferably ranges between about 25 and about 175. These oxyalkylated polyhydric alcohols are generally prepared by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides by either random addition or step-wise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed. Mixtures of oxyalkylated polyhydric alcohols are also suitable for use in the process of this invention.

The organic polyisocyanates used in the preparation of the polyurethane foams of this invention include toluene diisocyanate, such as the 4:1 mixture or the 65:35 mixture of the 2,4- and 2,6- isomers, ethylene diisocyanate, propylene diisocyanate, methylene-bis-4-phenyl isocyanate, 3,3' - bitoluene-4,4' diisocyanate, hexamethylene diisocyanate, napythalene-1,5-diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index."

The polyurethane foams are prepared in the presence of a foaming agent, reaction catalysts, and preferably a small proportion of a conventional surfactant. The foaming agent employed may be any of those known to be useful for this purpose such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, or mixture thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T.H. Ferringno, *Rigid Plastic Foams* (New York: Reinhold Publishing Corp., 1963), pp. 38–42, disclose various surfactants which are useful for this purpose. Generally up to 2 parts by weight of the surfactant are employed per 100 parts of the polyol.

Various additives can be employed which serve to provide different properties, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

More in detail, in the practice of this invention a polyurethane foam forming reaction mixture is placed in a mold where reaction proceeds. As noted earlier, any mold of whatever size and configuration may be employed. Although a closed mold may be used, it is preferred to use open top molds, easy access to the interior of the mold being had through the top for purposes of placing the reaction mixture therein and subsequently applying the compressive force to the fully risen foam.

After placing the foam forming reaction mixture in the mold, any means of whatever size, shape or location within the mold may be employed to constrain or limit the free rise of the foam in the desired section of the mold. Thus, as in the preferred embodiment of the invention illustrated in the drawings, the constraining means may be an insert, or an element separate from the mold, which can be placed therein before or soon after pouring in the foam forming reaction mixture; or, the constraining means may be built into the mold. A simple illustration of this is a U-shaped or an L-shaped mold, in which the free rise of the foam would be constrained in the middle section of the U or the flat section of the L, pressure being thereafter applied to the foam through the two open legs of the U or the open one leg of the L. Also, two or more constraining means, having the same or different sizes and shapes, may be employed depending on the shape, utility and density requirements in the finished foam product.

Where the constraining means is not a fixed part of the mold, it may be placed or inserted into the mold by any convenient means such as by lowering into the mold using cables and pulleys. It is then held firmly in place against the pressure of the rising foam by any securing means such as by means of fasteners securing the insert to the mold. In certain applications, the weight of the insert may be sufficient, in and of itself, to withstand the pressure of the rising foam.

The foaming reaction is exothermic, and auxiliary heat is not necessary to effect the reaction, although it may, of course, be employed. After the foam forming reactants have been admixed for a period between about 0.1 and about 20 seconds, an emulsion or "cream" forms. As the temperature increases from the reaction, gas bubbles are generated, which cause the formation of substantially uncured cellular gel material that gradually rises to fill the unoccupied space in the mold interior. After the generation of gas bubbles stops, the rise of the gel material stops. The foam at this point will be substantially uncured or partially cured, it will consist of two or more integral sections of varying thicknesses depending on the configuration of the mold interior and the number, shape and size of the constraining means therein, and its density, which is the original free rise density of the particular foam forming reaction mixture, will be uniform throughout. As noted earlier, the amount of reaction mixture placed in the mold would be calculated, based on the particular composition, to have a free rise volume substantially equal to the volume of the unoccupied space in the interior of the mold.

In applying compression to the fully risen foam, two critical process variables must be observed as disclosed in U.S. Pat. No. 3,506,600. The first variable, which is referred to hereinafter as the "crush time", is the period of time which elapses between the completion of the rise of the foam and the application of the compression thereto. In the practice of this invention, this period of time can range from 0 to about 10 minutes, with the preferred range being 0 to about 5 minutes.

The second critical variable is the temperature of the ambience during the crush time. During this period it has been found that the partially cured cellular material must be maintained within a critical environmental temperature range that is related to the crush time. Thus, where the crush time is between about 0 and about 2.5 minutes, temperatures between about 45° and about 400°F. and preferably between about 45° and about 200° F. are employed. Narrower temperature ranges are utilized where the partially cured cellular material is maintained for a longer crush time. Thus, where the time interval is between about 2.5 and about 5 minutes, temperatures between about 45° and about 200°F. and preferably between about 45° and 100°F are maintained; while temperatures between about 45° and 110°F. and preferably between about 45° and about 85°F. are empoyed where about 5 to about 10 minutes elapse before the appication of the compressive force. Conventional means, such as ovens and cooling systems may be employed, if necessary, to provide the desired temperatures.

In commercial operations, it is particularly preferred to operate under environmental conditions, and thus temperatures from about 70° to about 110°F. are employed while maintaining the crush time within the broad range of 0 to about 10 minutes.

At the end of the crush time, at least one section of the partially cured polyurethane foam is densified by compressing it to a fraction of its original height or thickness. Preferably the density of the foam, after it has been compressed, ranges from about 1.5 to about 10 pounds per cubic foot. The degree of densification in each section of the foam will of course bear a direct relationship to the compression ratio, i.e., the ratio of the original thickness to the thickness after compression in that section. This ratio can be varied over a wide range depending on the density requirements in the final foam product. It is preferable in practicing this invention, however, to compress the foam to between ⅔ and 1/10 of its original thickness, thereby imparting a density to the foam which is at least 50 percent greater than its free rise density, the direction of the compression being substantially parallel to the direction of expansion or rise of the foam.

As noted earlier, the compressive pressure which is applied to the foam can be derived from any convenient means such as a hydraulic piston. Such pressure can conveniently be applied to the foam through the open top of the mold, using a plate or a male mold of the desired size and configuration.

The duration of the compression and the temperature of the surface through which pressure is applied to the foam are not critical in practicing the invention, although practical considerations call for conveniently operating at environmental or room temperature and for keeping the compression duration to a minimum, i.e., less than 60 seconds. However, in certain instances it may be advantageous to compress the foam for an extended period of time, and the compressing surface which contacts the foam may also be heated. Thus if the outer layers of foam have become fully cured by the time compression is applied, they would not be amenable to being permanently compressed and densified under ordinary conditions. The compressed foam would than have one or two outer layers of undensified foam. In certain applications, this may be desirable. But if it is not, it may be obviated by prolonging the compression duration and/or heating the compressing surface.

After the foam has been compressed, the compressive pressure is removed and curing of the foam is completed. Where the duration of the compression is prolonged and the thickness of the polyurethane foam is relatively small, it is possible that the polyurethane foam will have become completely or substantially cured by the time the compressive force is removed. Thus it will be recognized that complete curing of the foam can be effected prior to, simultanious with, or subsequent to the removal of the compressive force; and that any one of these combinations is encompassed by the procedural step referred to in the specification and claims herein as "removing the compression and the completing the cure of the cellular material".

While curing of the foam can be accelerated by the application of heat, such treatment is not generally necessary since the foam will completely cure under ambient conditions. Thus it will be recognized that completion of the cure can be effected with or without the use of elevated temperatures.

After removal of the compression and completion of the cure the densified foam may recover a small portion of the difference between its initial height and its compressed height. However, since it has been permanently densified, it is apparent that such recovery is at most fractional and that the foam never completely regains its original dimensions.

Molded to the desired dimensions and configuration, the fully cured flexible foam of the invention, when removed from the mold, can be used as is. No cutting or trimming is generally necessary. Of course where several units are molded in a multi-unit mold, then a cutting operation will be necessary to separate the units; and where the particular application so requires, a trimming or slicing operation may be necessary before the foam is utilized.

The molded, fully cured flexible foams of the invention will consist of at least two sections of different densities having boundary lines which are substantially parallel to the direction of compression; and, as noted earlier, the density gradient at the juncture between every two sections will be abrupt. That is, the change in density from one section to another adjacent section will be well-defined, rather than gradual, and the density throughout each section will be substantially uniform.

The regions of foam which have been subjected to permanent densification in accordance with the teachings of the invention will have a Sac factor generally ranging from about 2.3 to about 10. Sac factor, as determined by ASTM-1564-64T, is the ratio of 65 percent Indentation Load Deflection to 25 percent Indentation Load Deflection. The Sac factors of the densified polyurethane foams of this invention are high, and thus these foams have little tendency to "bottom-out". The term "bottoming-out" is employed in the cushioning trade to describe a foam in which there is a sensation of sinking through and hitting the bottom when someone sits on it.

The molded, multiple density flexible foams of the invention are of particular utility, as indicated earlier, in making automotive bucket seats. Here the configuration and size of the mold and the insert, and the extent of the compression, can be predetermined so that the integral foam, after compression and curing, will have the dimensions of a standard bucket seat having an undensified or slightly densified seat section and a highly densified boundary section. As such the foam when removed from the mold, will be ready, as is, for use by the automotive industry.

The molded, multiple density flexible foams of the invention are also of utility in numerous other applications such as furniture construction, cushionings, paddings, and so forth.

The following examples are provided to further illustrate the invention. In these examples, all parts and percentages are by weight unless otherwise specified.

EXAMPLE 1

A flexible polyurethane foam forming reaction mixture having a free rise density of approximately 1.6 pounds per cubic foot was prepared by admixing the following ingredients in the indicated proportions:

| Ingredients | Parts by Weight |
| --- | --- |
| Oxypropylated Glycerin (Molecular Weight 3,000) | 100.0 |
| Toluene Diisocyanate (80% 2,4- and 20% 2,6-isomer; 110 index) | 50.6 |
| Water | 4.0 |
| Stannous Octoate | 0.25 |
| Triethylene Diamine | 0.35 |
| Polydimethylsiloxane (Dow-Corning DC-190) | 1.5 |

Using the molding apparatus shown in FIG. 1, including a mold 1 having a height of about 11 inches, an amount of the above mixture necessary to fill the mold, on a free rise basis, excepting the section to be occupied by insert 2 was spread over the bottom of the mold, and, immediately thereafter, insert 2 was lowered into the mold to a height of 4 inches from the bottom thereof. It was held firmly in that position as the rising foam filled the entire mold except for the region occupied by the insert. Ninety seconds after the formation of health bubbles on the surface of the foam, signaling the completion of the foaming, lid 3 was placed on the surface of the foam surrounding insert 2 and both the lid and the insert were pressed down to a uniform position 2 inches from the bottom of the mold. The foam was then cured at 100°C for 10 minutes, whereupon the molding apparatus was disassembled and the foam was removed.

The resulting integral foam block, which could be utilized as a seat cushion, had a uniform height and consisted of two sections, one outer section of highly densified foam and an inner section of less densified foam. The density gradient at the juncture of the two sections was well-defined and abrupt. The density of each section was measured, and compressive deflection tests were run on each section. The results are recorded in Table I below.

TABLE I

| Foam Section | Inner | Outer |
| --- | --- | --- |
| Compression Ratio | 2:1 | 5.5:1 |
| Density (lbs./Cu.Ft.) | 2.8 | 6.3 |

TABLE I-Continued

| Foam Section | Inner | Outer |
| --- | --- | --- |
| Resistance to Compression | | |
| at 25% deflection | 0.37 | 2.12 |
| at 50% deflection | 0.89 | 5.75 |
| at 65% deflection | 1.81 | 12.75 |
| at 75% deflection | 13.95 | 29.83 |
| Sac factor | 5.00 | 5.80 |

As indicated by the data of Table I, while both the inner and the outer foam sections had high Sac factors, the outer section was considerably denser and firmer than the inner section.

EXAMPLE 2

The procedure of Example 1 was repeated using the same apparatus and reaction mixture, except that the amount of the latter was such as would, on a free rise basis, fill the mold to a height of only 8 inches, exclusive of the space occupied by the insert. This was done in order to obtain a foam in the outer section having a compression ratio of 4/1. After curing the compressed foam and demolding, the density of each of the two foam sections was measured. The results are recorded in table II below.

EXAMPLE 3

The procedure of Example 1 was again followed, using the following ingredients in the indicated proportions:

| Ingredients | Parts by Weight |
| --- | --- |
| Polyol Blend (oxypropylated glycerin, 80% molecular weight 3000 and 20% molecular weight 1000) | 100 |
| Toluene Diisocyanate (80% 2,4- and 20% 2,6-isomer; 110 index) | 43.4 |
| Water | 3.2 |
| Stannous Octoate | 0.25 |
| Triethylene Diamine | 0.45 |
| Silicone Surfactant | 2.0 |
| Trichloromonofluoromethane | 20 |

An amount of the above reaction mixture sufficient to fill the mold to an approximate height of 6.2 inches, exclusive of the space occupied by the insert, was used. Otherwise, the identical steps recited in Example 1 were followed. After curing and demolding, the density of each of the two foam sections was measured and the results are recorded in Table II below.

EXAMPLE 4

This example is provided to illustrate the utility of the invention in preparing foam having a highly densified section integral with an undensified section of foam. The same ingredients, proportions, and procedural steps of Example 1 were used, with two exceptions. One was that the amount of reaction mixture used was sufficient to fill the mold, on a free rise basis, to a height of 10 inches exclusive of the space occupied by the insert. Secondly, the foam was compressed to a height of 4 inches, which is the height of the foam in the middle section directly underneath the insert. In other words, the middle foam section was not subjected to any compression.

After curing, the resulting foam block had a substantially uniform height, and consisted of a densified outer foam section integral with an inner section of practically undensified foam. The density of each section was measured and the results are recorded in Table II below.

TABLE II

| Example No. | Compression Ratio | | Density ( lb./cu. ft.) | |
|---|---|---|---|---|
| | inner section | Outer section | inner section | Outer section |
| 1 | 2:1 | 5.5:1 | 2.8 | 6.3 |
| 2 | 2:1 | 4.0:1 | 2.8 | 5.6 |
| 3 | 2:1 | 3.1:1 | 2.4 | 3.7 |
| 4 | 1:1 | 2.5:1 | 1.7 | 4.2 |

The data of Table II shows that the degree of densification in any particular section of the foam prepared according to the teachings of this invention varies with the compression ratio and with the polyurethane foam composition.

EXAMPLE 5

To illustrate the applicability of the invention to polyurethane compositions in which the polyol is a polyester polyol, a polyurethane foam-forming reaction mixture was prepared by admixing the following ingredients in the indicated proportions:

| Ingredients | Parts by Weight |
|---|---|
| Polyester Polyol (Witco Chem. Co. "Fomrez-50")* | 100 |
| Water | 4.1 |
| Toluene Diisocyanate (80% 2,4-, 20% 2,6-isomer; 108 index) | 69.5 |
| Calcium Stearate | 0.30 |
| 33% solution of ethylene diamine in dipropylene glycol | 0.45 |
| Emulsifier (Witco Chemical Co. "Emcol H-77-86")** | 0.90 |
| Polydimethylsiloxane stabilizer ( Union Carbide "Niax L-532") | 0.60 |

* This is a polyester polyol prepared from adipic acid, diethylene glycol, and trimethylol propane
** This is a blend of polyalcohol carboxylic esters and sulfonated oils.

Again the apparatus depicted in FIG. 1 and the procedural steps of Example 1 were employed. An amount of the above reaction mixture sufficient to fill the mold on a free rise basis, exclusive of the space occupied by the insert, to a height of about 6.2 inches was placed in the mold. Thirty seconds after the formation of health bubbles, the foam was compressed to a uniform height of about 2 inches and then cured. After demolding, the density of each of the two foam sections was measured. The inner section, in which the compression ratio was 2:1, had a density of 2.59 pounds per cubic foot whereas the outer section, in which the compression ratio was 3.1:1, had density of 3.86 pounds per cubic foot. The density gradient at the juncture was well-defined and abrupt.

What is claimed is:

1. A flexible, molded polyurethane foam, prepared from a single foam forming formulation having at least two integral sections of different densities, at least one of said sections being densified by compression to a density which is at least 50 percent greater than the free rise density of the foam, the boundary lines between said sections being substantially parallel to the direction of said compression.

2. A flexible, molded polyurethane foam of claim 1 having two integral sections of different densities.

3. A flexible, molded polyurethane foam of claim 2 in which each of said sections is densified foam.

4. A flexible, molded polyurethane foam of claim 3 in which said polyurethane is polyether polyurethane.

* * * * *